United States Patent
Theuerkauf et al.

(10) Patent No.: US 11,312,789 B2
(45) Date of Patent: Apr. 26, 2022

(54) SIZE REDUCTION OF ETHYLCELLULOSE POLYMER PARTICLES

(71) Applicant: Dow Global Technologies LLC, Midland, MI (US)

(72) Inventors: Jorg Theuerkauf, Lake Jackson, TX (US); Robert B. Appell, Midland, MI (US); Peter E. Pierini, Lake Jackson, TX (US); Christopher J. Tucker, Midland, MI (US)

(73) Assignee: NUTRITION & BIOSCIENCES USA 1, LLC, Rochester, NY (US)

( * ) Notice: Subject to any disclaimer, the term of this patent is extended or adjusted under 35 U.S.C. 154(b) by 0 days.

(21) Appl. No.: 15/533,381

(22) PCT Filed: Dec. 10, 2015

(86) PCT No.: PCT/US2015/064929
§ 371 (c)(1),
(2) Date: Jun. 6, 2017

(87) PCT Pub. No.: WO2016/094624
PCT Pub. Date: Jun. 16, 2016

(65) Prior Publication Data
US 2017/0369596 A1   Dec. 28, 2017

Related U.S. Application Data

(60) Provisional application No. 62/091,094, filed on Dec. 12, 2014.

(51) Int. Cl.
| | | |
|---|---|---|
| *C08B 11/20* | (2006.01) | |
| *C08J 3/05* | (2006.01) | |
| *C08J 3/12* | (2006.01) | |
| *C08B 11/08* | (2006.01) | |
| *F28D 1/04* | (2006.01) | |

(52) U.S. Cl.
CPC .............. *C08B 11/20* (2013.01); *C08B 11/08* (2013.01); *C08J 3/05* (2013.01); *C08J 3/12* (2013.01); *C08J 2301/28* (2013.01); *F28D 1/04* (2013.01)

(58) Field of Classification Search
CPC ............... C08B 11/20; C08J 3/12; C08J 3/03
USPC .......................................... 536/100, 86, 124
See application file for complete search history.

(56) References Cited

U.S. PATENT DOCUMENTS

| | | | |
|---|---|---|---|
| 4,329,451 A | 5/1982 | Zweigle | |
| 4,330,338 A | 5/1982 | Banker | |
| 6,169,130 B1 | 1/2001 | Bodmeier et al. | |
| 2005/0079278 A1* | 4/2005 | Burrows | C23C 14/12 427/69 |

FOREIGN PATENT DOCUMENTS

| | | | | |
|---|---|---|---|---|
| CA | 2948948 A1 | * | 11/2015 | ............. C04B 35/10 |
| CN | 201140345 Y | * | 10/2008 | |
| CN | 101602865 A | | 12/2009 | |
| JP | H09165329 A | | 6/1997 | |
| WO | 2016025568 A1 | | 2/2016 | |

OTHER PUBLICATIONS

Database WPI—Thomson Scientific—XP002755372.
Schindhelm, et al., "Wet ultrafine grinding of ethyl cellulose by agitator bead mill", pp. 1-3, (2012).
Iqbal et al., "Preparation of Ethylcellulose Latex by Aqueous Dispersions: Importance of the Particle Size and Plasticizer", J.Chem. Soc.Pak., pp. 634-639, vol. 33, No. 5, (2011).
Wagner, et al., "Improvement of the Low-Temperature Stability of an Aqueous Colloidal Ethylcellulose Dispersion, Aquacoat® ECD, and Preparation/Characterization of a Redispersible Aquacoat® ECD Powder", Drug Development and Industrial Pharmacy, vol. 29, No. 3, pp. 267-275 (2003).
Zhang, et al., "Preparation and Solidification of Redispersible Nanosuspensions", J Pharmaceutical Sciences, vol. 103, pp. 2166-2176 (2014).

* cited by examiner

*Primary Examiner* — Shaojia A Jiang
*Assistant Examiner* — Everett White

(57) ABSTRACT

Provided is a process for reducing the size of ethylcellulose polymer particles comprising
(a) providing a slurry comprising
  (i) water
  (ii) said ethylcellulose particles, wherein said ethylcellulose polymer particles have D50 of 100 μm or less;
  (iii) surfactant comprising 1.2% or more anionic surfactants by weight based on the solid weight of said slurry, with the proviso that if the amount of anionic surfactant is 2.5% or less by weight based on the solid weight of said slurry, then said surfactant further comprises 5% or more stabilizers by weight based on the solid weight of said slurry, wherein said stabilizer is selected from the group consisting of water-soluble polymers, water-soluble fatty alcohols, and mixtures thereof.
(b) grinding said slurry in an agitated media mill having a collection of media particles having a median particle size of 550 μm or smaller.
Also provided is a dispersion made by such a process.

21 Claims, 2 Drawing Sheets

SIZE REDUCTION OF ETHYLCELLULOSE POLYMER PARTICLES

Dispersions of particles of ethylcellulose polymer are useful for a variety of purposes, for example in the manufacture of controlled gradual-release pharmaceutical formulations. For many purposes, it is desirable that the size of the dispersed particles ethylcellulose polymer are as small as possible.

S. Schindhelm et al., in "Wet ultrafine grinding of ethyl cellulose by agitator bead mill" (https://www.oth-regensburg.de/fileadmin/media/fakultaeten/ei/forschung_projekte/MAPR_Veröffentlichungen/ARC_Schindhelm.pdf) discloses the use of an agitator bead mill with milling beads in the size range 0.6 to 0.8 mm to produce dispersions of ethylcellulose polymer. S. Schindhelm et al. state that the useful particle size is 1 to 4 µm. It is desired to provide a method that produces dispersions of ethylcellulose polymer in which the particle size is even smaller.

The following is a statement of the invention.

A first aspect of the present invention is a process for reducing the size of ethylcellulose polymer particles comprising
(a) providing a slurry comprising
  (i) water
  (ii) said ethylcellulose particles, wherein said ethylcellulose polymer particles have D50 of 100 µm or less;
  (iii) surfactant comprising 1.2% or more anionic surfactants by weight based on the solid weight of said slurry, with the proviso that if the amount of anionic surfactant is 2.5% or less by weight based on the solid weight of said slurry, then said surfactant further comprises 5% or more stabilizers by weight based on the solid weight of said slurry, wherein said stabilizer is selected from the group consisting of water-soluble polymers, water-soluble fatty alcohols, and mixtures thereof.
(b) grinding said slurry in an agitated media mill having a collection of media particles having a median particle size of 550 µm or smaller.

A second aspect of the present invention is a dispersion of ethylcellulose polymer particles in an aqueous medium, wherein said aqueous medium comprises water, wherein 90% or more of said ethylcellulose polymer particles by volume have diameter of 2 µm or less, and wherein said dispersion comprises surfactant, said surfactant comprising 1.2% or more anionic surfactants by weight based on the solid weight of said dispersion, with the proviso that if the amount of anionic surfactant is 2.5% or less by weight based on the solid weight of said dispersion, then said surfactant further comprises 5% or more stabilizers by weight based on the solid weight of said dispersion, wherein said stabilizer is selected from the group consisting of water-soluble polymers, water-soluble fatty alcohols, and mixtures thereof.

Figure 1:
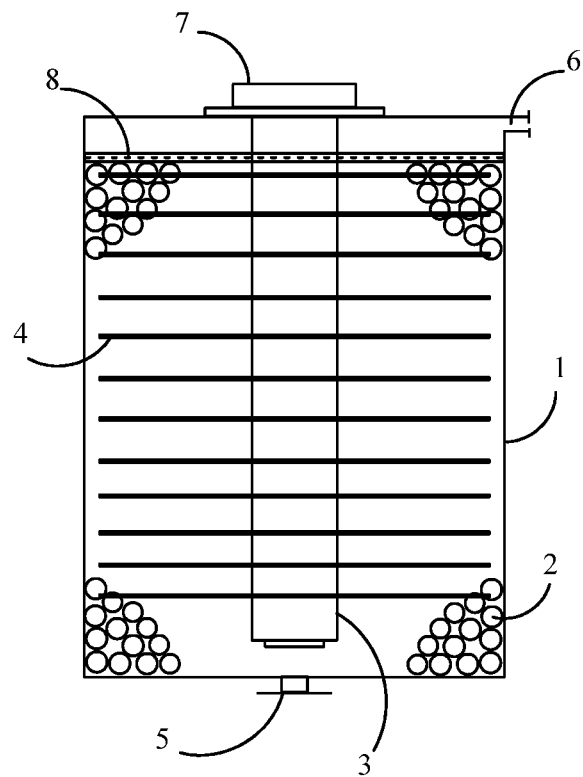
Figure 2:
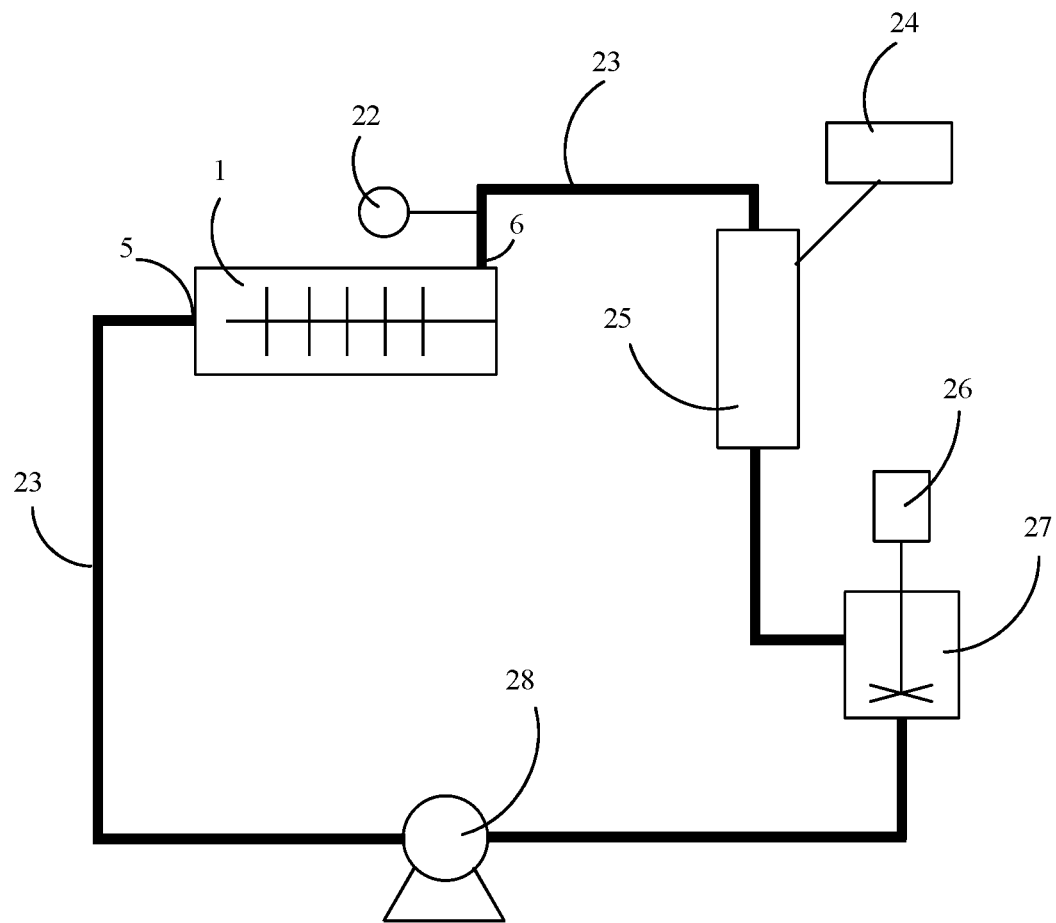

The following is a brief description of the drawings. FIG. 1 shows one embodiment of an agitated media mill. FIG. 2 shows one embodiment of the grinding step of the present invention.

The following is a detailed description of the invention.

As used herein, the following terms have the designated definitions, unless the context clearly indicates otherwise.

As used herein, an aqueous composition has 20% or more water by weight based on the weight of the composition. As used herein, a dispersion is a composition that contains a continuous medium that is liquid at 25° C. and contains discrete particles (herein called the "dispersed particles") of a substance that are distributed throughout the continuous liquid medium. As used herein, an aqueous dispersion is an aqueous composition that is a dispersion in which the continuous liquid medium contains 50% or more water by weight based on the weight of the continuous liquid medium. Substances that are dissolved in the continuous liquid medium are considered herein to be part of the continuous liquid medium. The collection of all the dispersed particles is known herein as the "solid phase" of the dispersion.

As used herein, the "solids" of an aqueous composition is the material that remains when water and compounds having a boiling point of 250° C. or less have been removed from the aqueous composition. The "solid weight" of an aqueous composition is the weight of the solids. As used herein, the "solids content" of an aqueous composition is the amount of solids. Solids content is characterized either by weight percent based on the total weight of the aqueous composition or by volume fraction based on the total volume of the aqueous composition.

A dispersion is stable. That is, when a dispersion is stored at 25° C. for 24 hours, 90% or more by volume of the dispersed particles remain distributed throughout the continuous medium and do not sink to the bottom of the vessel or float to the top of the dispersion or coagulate with each other.

As used herein, a slurry is a mixture of a continuous liquid medium and discrete solid particles. A slurry may or may not be stable. When the slurry is subjected to sufficient mechanical agitation, the solid particles will be distributed throughout the continuous liquid medium. When no mechanical agitation is present, the solid particles may or may not separate from the continuous liquid medium by settling to the bottom of the container or floating to the top of the continuous liquid medium.

A collection of particles may be characterized according to the size of the particles. The size of a particle is characterized by the diameter of the particle. If the particle is not spherical, the diameter is considered herein to be the diameter of a sphere that has the same volume as the particle. The sizes of the particles in a collection of particles is characterized by parameters of the form DXY, where XY is a two-digit number from 01 to 99. The parameter DXY is a diameter chosen such that XY % of the particles in the collection, by volume, have diameter of DXY or smaller. For example, D50 is the diameter such that 50% by volume of the particles in the collection have diameter of D50 or less.

Ethylcellulose polymer, as used herein, means a derivative of cellulose in which some of the hydroxyl groups on the repeating glucose units are converted into ethyl ether groups. The number of ethyl ether groups can vary. The USP monograph requirement for ethyl ether content is from 44 to 51%.

As used herein, the viscosity of an ethylcellulose polymer is the viscosity of a 5 weight percent solution of that ethylcellulose polymer in a solvent, based on the weight of the solution. The solvent is a mixture of 80% toluene and 20% ethanol by weight. The viscosity of the solution is measured at 25° C. in an Ubbelohde viscometer.

As used herein, a fatty acid is a compound having a carboxyl group and a fatty group. A fatty group is a linear or branched chain of carbon atoms connected to each other that contains 8 or more carbon atoms. A hydrocarbon fatty group contains only carbon and hydrogen atoms.

A compound is considered herein to be water soluble if 2 grams or more of the compound will dissolve in 100 grams of water at 25° C. A compound is considered water soluble even if it is required to heat the water to a temperature higher than 25° C. in order to form the solution, as long as the solution of 2 grams or more of the compound in water is a stable solution at 25° C.

A "polymer," as used herein is a relatively large molecule made up of the reaction products of smaller chemical repeat units. Polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 daltons or higher.

A water-soluble polymer is considered herein to be a neutral water-soluble polymer if the polymer, when present in a solution of water, has no appreciable amount of any covalently bound ionic groups in an ionic state at any pH from 3 to 11. As used herein, "no appreciable amount" means 0 to 0.001 milliequivalents of ionic groups per gram of polymer.

As used herein, an anionic surfactant is a compound whose molecule contains one or more fatty group and one or more anionic group. An anionic group is a group that is in an anionic state when present in water over a pH range that includes pH of 8 to 9. That is, when a collection of the molecules of an anionic surfactant are present in water, there is a range of pH values over which 90 mole percent or more of the anionic groups are in an anionic state, and that pH range includes pH values from 8 to 9.

As used herein, a fatty alcohol is a compound whose molecule contains one or more fatty group and one or more hydroxyl group. The molecule of a fatty alcohol does not contain any acidic groups different from hydroxyl groups. The molecule of a fatty alcohol does not contain any sulfate, sulfonate, phosphate, or carboxylate groups.

As used herein, an agitated media mill is an apparatus that includes a container, grinding media inside the container, one or more agitator that applies mechanical agitation to the grinding media, and optional other parts.

Any ethylcellulose polymer may be used in the present invention. The ethyl ether content of the ethylcellulose polymer is 44% or more; preferably 47% or more; more preferably 48% or more. The ethyl ether content of the ethylcellulose polymer is 51% or less; preferably 50% or less.

The ethylcellulose polymer preferably has viscosity of 2 mPa-s or higher; more preferably 5 mPa-s or higher; more preferably 12 mPa-s or higher; more preferably 16 mPa-s or higher. The ethylcellulose polymer preferably has viscosity of 120 mPa-s or lower; more preferably 100 mPa-s or lower; more preferably 80 mPa-s or lower; more preferably 60 mPa-s or lower; more preferably 40 mPa-s or lower; more preferably 30 mPa-s or lower.

Commercially available forms of ethylcellulose polymer which may be used in the invention include, for example, those available under the name ETHOCEL™, from The Dow Chemical Company. The ethylcellulose polymers used in the inventive examples are commercially available from The Dow Chemical Company as ETHOCEL™ Standard 4, ETHOCEL™ Standard 7, ETHOCEL™ Standard 10, ETHOCEL™ Standard 20, ETHOCEL™ Standard 45, or ETHOCEL™ Standard 100 with ethyl ether content from 48.0 to 49.5%. Other commercially available ethylcellulose polymers useful in embodiments of the invention include certain grades of AQUALON™ ETHYLCELLULOSE, available from Ashland, Inc., and certain grades of ASHACEL™ ethylcellulose polymers, available from Asha Cellulose Pvt.Ltd.

The present invention involves providing a slurry that contains water, ethylcellulose polymer particles, and surfactant. Preferably the continuous liquid medium of the slurry contains water in an amount, by weight based on the weight of the continuous liquid medium, of 50% or more; more preferably 70% or more; more preferably 80% or more.

The slurry contains ethylcellulose polymer particles having D50 of 100 μm or less; preferably 50 μm or less; more preferably 25 μm or less.

Some typical manufacturing processes for making ethylcellulose polymer particles produce collections of particles having D50 of more than 100 μm. If it is desired to use such a collection of ethylcellulose polymer particles, the collection may be subjected to one or more operation of any one or more size reduction processes including, for example, dry grinding, ball milling, jet milling, wet grinding in an agitated media mill, or a combination thereof. When it is necessary to use a size reduction process to produce a collection of particles having D50 of 100 μm or lower, a preferred size reduction process is jet milling.

The slurry contains anionic surfactant. Preferred anionic surfactants have a single fatty group. Preferred fatty groups in the surfactant have 10 or more carbon atoms. Preferred fatty groups in the surfactant have 18 or fewer carbon atoms; more preferably 16 or fewer carbon atoms; more preferably 14 or fewer carbon atoms. Preferred anionic groups are sulfate, sulfonate, phosphate, and carboxylate; more preferred are sulfate and sulfonate; more preferred is sulfate.

In some embodiments the slurry contains one or more stabilizer that is selected from water-soluble polymers, water-soluble fatty alcohols, and mixtures thereof.

Among water-soluble polymers, preferred are polyvinyl alcohol (PVA), poly(N-vinyl pyrrolidone), and neutral water-soluble polymers that are derivatives of cellulose. Preferred is PVA.

Among fatty alcohols, preferred are fatty esters (herein "E1 esters") that have the structure of an ester of a fatty carboxylic acid with a multihydroxyl alcohol, in which one or more of the hydroxyl groups on the multifunctional alcohol remains as a hydroxyl group. Among E1 esters, preferred are those in which the residue of the multihydroxyl alcohol is a residue of glycerol. Among E1 esters, preferred are those that have two hydroxyl groups remaining. Among E1 esters, preferred are those in which the residue of the fatty acid is a fatty acid having a fatty group of 14 or more carbon atoms; more preferably 16 or more carbon atoms. Among E1 esters, preferred are those in which the residue of the fatty acid is a fatty acid having a fatty group of 22 or fewer carbon atoms. Among E1 esters, preferred are those in which the residue of the fatty acid is a fatty acid having a fatty group that is a hydrocarbon fatty group having no double bonds. A preferred fatty acid residue is a residue of stearic acid.

Among fatty alcohols, preferred are those with molecular weight of 1,000 or less; more preferably 750 or less; more preferably 500 or less.

The amount of anionic surfactant is 1% or more by weight based on the solid weight of the slurry. When the amount of anionic surfactant is 2.5% or less by weight based on the solid weight of the slurry, one or more stabilizer is also present. When a stabilizer is present, the amount of stabilizer preferably is, by weight based on the solid weight of the slurry, 5% or more; preferably 6% or more. When a stabilizer is present, the amount of stabilizer preferably is, by weight based on the solid weight of the slurry, 15% or less; more preferably 12% or less; more preferably 10% or less.

The "solid weight of the slurry" does not include the weight of any grinding media. The solid weight of the slurry includes the weight of solids including ethylcellulose polymer, anionic surfactant, stabilizer (if present), and any materials that are dissolved in the aqueous liquid medium or that form a stable dispersion in the aqueous liquid medium.

When the amount of anionic surfactant is more than 2.5% by weight based on the solid weight of the slurry, the use of further surfactant including stabilizer is optional, though the use of further surfactant including stabilizer is preferred. Preferably, the amount of stabilizer is 5% or more by weight based on the solid weight of the slurry, regardless of the amount of anionic surfactant. Preferably, the amount of anionic surfactant is more than 2.5% by weight based on the solid weight of the slurry.

Preferably, the slurry contains little or no material other than water, ethylcellulose polymer, anionic surfactant(s), and stabilizer(s). That is, the amount of material other than water, ethylcellulose polymer, anionic surfactant(s), and stabilizer(s) is preferably, by weight based on the solid weight of the slurry, 0 to 3%; more preferably 0 to 1%; more preferably 0 to 0.3%; more preferably 0 to 0.1%.

The method of the present invention involves the use of an agitated media mill. The agitated media mill contains grinding media. Grinding media are particles of one or more materials, each of which is harder than ethylcellulose polymer particles. Preferred grinding media are glass, steel, and ceramic; more preferred is ceramic; more preferred is ceramic that contains zirconia; more preferred is ceramic that contains both zirconium dioxide and yttrium oxide. Preferred grinding media are round particles that are spherical or nearly spherical. Preferred grinding media have D50 of 2 mm or less; more preferably 1 mm or less; more preferably 500 µm or less.

The agitated media mill includes an agitator. The agitator is an object that moves relative to the container and causes particles of grinding media to collide with each other. Preferred agitators are rotating shafts with disks or pins or both attached and rotators that create an annular gap; more preferred are rotating shafts with attached disks or pins or both; more preferred are rotating shafts with disks attached.

Rotating shafts may be hollow or solid. Preferred rotating shafts are cylindrical. Preferably the rotating shaft is a cylinder that is rotated such that the axis of rotation is the same as the geometrical axis of the cylinder. When a rotating shaft is used, preferably the interior of the container is a cylindrical volume having the same geometrical axis as the rotating shaft.

When pins are attached to a rotating shaft, preferably the pins are cylinders of diameter smaller than the diameter of the cylindrical volume of the interior of the container. When pins are attached to a rotating shaft, the pins preferably perpendicular to the axis of rotation. Optionally, pins are affixed to the interior wall of the container so that the pins attached to the rotating shaft pass close to pins affixed to the interior wall.

When disks are attached to a rotating shaft, preferably the plane of each disk is perpendicular to the axis of rotation. When disks are attached to a rotating shaft, preferably the ratio of the diameter of each disk to the diameter of the cylindrical interior of the container is 0.5:1 or greater; more preferably 0.75:1 or greater; more preferably 0.9:1 or greater. Disks optionally have holes through the plane of the disk.

Among agitated media mills that use a rotating shaft, the mill may be oriented vertically or horizontally.

The temperature of the process of the present invention is preferably characterized by measuring the temperature of the slurry at the outlet of the agitated media mill. Temperature may be measured by thermometer, thermister, thermocouple, or other temperature measurement device. Preferably, the temperature remains below 20° C. during the process; more preferably, at 17° C. or below; more preferably at 16° C. or below; more preferably at 15° C. or below; more preferably at 14° C. or below. Preferably, the temperature remains above 0° C., more preferably 4° C. or above; more preferably 6° C. or above.

One example of a suitable agitated media mill is shown in FIG. 1. The container 1 encloses an interior volume. Container 1 is a cylinder, the axis of which is the same as the axis of rotation of shaft 3. Inside that interior volume are grinding media 2 and rotating shaft 3 and circular plates 4 attached to rotating shaft 3. It is contemplated that the amount of grinding media 2 is greater than the amount shown if FIG. 1. Rotating shaft 3 is driven by driving mechanism 7, which may be a motor or a coupling attached to a motor. Rotating shaft 3 rotates around an axis that lies in the plane of the figure in the center of the rotating shaft 3. Slurry enters through inlet 5, encounters the grinding media 2, and passes through grid 8, which passes slurry while retaining grinding media 2. Slurry then exits through outlet 6. An agitated media mill like that shown in FIG. 1 may be oriented in space either vertically or horizontally. If it is oriented horizontally, grid 8 may not be necessary, of outlet 6 is located on the top side of the mill.

Preferably, the slurry makes multiple passes through the agitated media mill. Preferably, the slurry passes through a recirculating loop in which slurry passes through the agitated media mill, then passes through a heat exchanger, and then passes through the agitated media mill again. Acceptable heat exchangers include one or more of the following types of heat exchanger: double pipe, shell and tube, plate, plate and shell, adiabatic wheel, and plate fin. Preferably, the heat exchanger uses a coolant fluid to absorb heat from the slurry, and a refrigeration mechanism for cooling the coolant fluid.

An example of a suitable recirculating loop is shown in FIG. 2. Slurry enters agitated media mill 1 by inlet 5 and exits by outlet 6. The temperature of the slurry is measured near outlet 6 using temperature measurement device 22. Slurry passes through the transfer tubes 23. Slurry passes through heat exchanger 25, which is controlled by thermostat mechanism 24. Slurry enters tank 27, which is stirred by motor-driven agitator 26. The slurry is moved through the transfer tubes 23 by pump 28.

Among heat exchangers, preferred are heat exchangers in which the slurry is brought into contact with one or more metal plates, and a heat exchange fluid is on the other side of those metal plates, so that heat may be transferred from the slurry to the heat exchange fluid with any mixing between the slurry and the heat exchange fluid. Preferably, the heat exchange fluid circulates in the heat exchanger. Preferably, the heat exchanger is equipped with an apparatus for cooling the heat exchange fluid.

Preferably, the product of the process of the present invention is an aqueous dispersion of ethylcellulose polymer particles having D90 of 2 µm or less; more preferably 1 µm or less. Preferably, the type and amount of surfactant in the dispersion produced by the process of the present invention are the same as those described above regarding the slurry used in the process.

Preferably, the continuous liquid medium of the dispersion contains water in the amount, by weight based on the weight of the continuous liquid medium, of 60% or more; more preferably 70% or more; more preferably 80% or more; more preferably 90% or more.

Preferably, the dispersed particles in the aqueous dispersion contain ethylcellulose polymer in an amount, by weight based on the total dry weight of the solid phase, of 40% or more; more preferably 50% or more; more preferably 60% or more. Preferably, the dispersed particles in the aqueous dispersion contain ethylcellulose polymer in an amount, by weight based on the total dry weight of the solid phase, of 90% or less; more preferably 80% or less. A dispersed particle is considered herein to contain both material located on the interior of the particle and material located on the surface of the particle, such as, for example, a dispersant or surfactant.

The aqueous dispersion preferably has a solids content, by weight based on the weight of the aqueous composition, of 5% or more; more preferably 10% or more; more preferably 15% or more; more preferably 20% or more. The aqueous dispersion preferably has a solids content, by weight based on the weight of the aqueous composition, of 55% or less; more preferably 50% or less; more preferably 45% or less; more preferably 40% or less; more preferably 35% or less.

The following are examples of the present invention.
The materials and abbreviations used were as follows:
Ex=Example (Examples with number ending in "C" are Comparative Examples)
Beads1=SiLibeads™ Type ZY yttrium-stabilized zirconium oxide from Sigmund Lindner in the size range of "1.0 mm" (0.8-1.0 mm)
Beads2=SiLibeads™ Type ZY yttrium-stabilized zirconium oxide from Sigmund Lindner in the size range of "0.4 mm" (0.3-0.4 mm)
EC1=Ethocel™ STD20 ethylcellulose polymer
Surf=surfactant
SDS=sodium dodecyl sulfate (anionic surfactant)
DSSS=dioctyl sodium sulfosuccinate (anionic surfactant)
Stab1a=Myverol™ 18-04K emulsifier from Kerry; glycerol monostearate
Stab1b=Myverol™ 18-07K, emulsifier from Kerry; glycerol monostearate, same composition as Stab1a but different grade
Stab2=Carbowax™ Sentry™ PEG 300 polyethylene glycol, from the Dow Chemical Company.
Stab3=Tween™ 80 polyoxyethylene sorbitan monooleate, from Croda
PVA=Mowiwol™ 8-88 polyvinyl alcohol from Sigma-Aldrich.
CA=citric acid
SA=stearic acid
SSL=sodium stearoyl lactylate (anionic surfactant)
X-Y° C.=range of temperature values
Milling Procedure:

All milling was carried out in aqueous slurries in a LabStar™ 1 laboratory agitator bead mill by Netzsch GmbH with a milling chamber volume of 0.5 L. The suspension was pumped axially through the mill and a sieving cartridge with gaps of 200 or 500 μm screen to preventing milling beads from leaving the grinding chamber. The grinding chamber was polyurethane-line stainless steel and the agitator was stainless steel. The grinding media were Beads1 or Beads2. Temperature control was provided by recirculation through an external heat exchanger.

Particle size distributions (PSD) were measured on slurry samples using a Beckman Coulter LS 13 320 laser diffraction particle size analyzer.

Production of Slurry (a)

Water (4596 g), EC1 ethylcellulose polymer (477 g), and Beads1 (1729 g) were mixed together, and the whole was pre-milled without surfactant at 3600 RPM using an outlet screen size of 0.5 mm with the temperature kept between 12° C. to 13° C. After a total of 14 hr milling time, the D90 was reduced to 12.3 μm.

EXAMPLE 1

Grinding of Slurry

A portion (790 g) of the slurry (a) produced as described above was diluted with water (200 g), mixed with Stab1 (4.89 g), SDS (2.15 g), and Beads2 and milled at 3600 RPM using an outlet screen size of 0.2 mm with the temperature kept between 11° C. to 12° C. After a total of 7.75 hr milling time, the D90 was reduced to 0.497 um.

EXAMPLE 2

Further Samples

Using the method of Example 1, various other samples were ground. Conditions and results were as follows:

| Ex. Number | 2-1-C | 2-2-C | 2-3-C | 2-4-C | 2-5-C | 2-6-C |
|---|---|---|---|---|---|---|
| Media (mm) | 1 | 1 | 0.4 | 1 | 1 | 1 |
| Temp[1] (° C.) | 9-11 | 12 | 10-11 | 19-28 | 17-18 | 19-20 |
| Anionic Surf. | none | none | none | none | none | SDS |
| Anionic Surf. %[2] | 0 | 0 | 0 | 0 | 0 | 1.1 |
| Stabilizer | none | none | none | none | Stab2 | none |
| Stabilizer %[2] | 0 | 0 | 0 | 0 | 7.5 | 0 |
| Specific E[3] | 17.5 | 10.7 | 51.3 | na[4] | 18.8 | 7.6 |
| D50 (μm) | 5.7 | 9.2 | 3.9 | 9.0 | 8.0 | 10.1 |
| D90 (μm) | 12.2 | 20.5 | 8.3 | 23.6 | 18.9 | 24.5 |

[1]Temperature
[2]by weight based on the solid weight of the slurry
[3]Specific Energy (kWH/kg)
[4]not evaluated Comparative Examples 2-1-C through 2-5-C are comparative because they have no anionic surfactant. Comparative Example 2-6-C is comparative because the amount of SDS is below 2.5% and no stabilizer is present. All of Comparative Examples 2-1-C through 2-6-C show relatively high values of D50 and D90.

| Number | 2-7 | 2-8-C | 2-9 | 2-10 | 2-11 | 2-12 |
|---|---|---|---|---|---|---|
| Media (mm) | 0.4 | 0.4 | 0.4 | 0.4 | 0.4 | 0.4 |
| Temp[1] (° C.) | 14-15 | 12-14 | 9-11 | 13 | 11-13 | 12-13 |
| Anionic Surf. | SDS | none | SDS | SDS | SDS | SDS |
| Anionic Surf. %[2] | 3.1 | 0 | 2.9 | 2.9 | 7.1 | 2.0 |
| Stabilizer | none | Stab1a | Stab1a | Stab1b | PVA | Stab1a |
| Stabilizer %[2] | 0 | 6.9 | 6.5 | 4.1 | 8.8% | 7.8 |
| Specific E[3] | 35.7 | 30.6 | 75.5 | 41.0 | 83.3 | 70.4 |
| D50 (μm) | 0.44 | 8.9 | 0.46 | 0.29 | 0.17 | 0.35 |
| D90 (μm) | 1.01 | 18.1 | 1.88 | 0.66 | 0.52 | 0.74 |

[1]-[4]as above

Comparative Example 2-8-C is comparative because it has no anionic surfactant, and it shows relatively high values of D50 and D90. Examples 2-7 and 2-9 through 2-12 all show much lower values of D50 and D90.

| Number | 2-13 | 2-14 | 2-15-C | 2-16-C |
|---|---|---|---|---|
| Media (mm) | 0.4 | 0.4 | 1 | 0.4 |
| Temp[1] (° C.) | 11-12 | 9-11 | 23-26 | 25-27 |
| Anionic Surf. | SDS | SDS | DSSS | DSSS |
| Anionic Surf. %[2] | 3.1% | 3.3 | 1.65 | 1.65 |
| 1st Stabilizer | Stab1a | Stab1b | Glycerol | Glycerol |
| 1st Stabilizer %[2] | 6.9 | 3.3 | 9.9 | 9.9 |
| Specific E[3] | 66.2 | na[4] | 24.0 | na[4] |
| D50 (μm) | 0.16 | 0.31 | 14.0 | 8.7 |
| D90 (μm) | 0.50 | 0.70 | 32.3 | 17.8 |

[1]-[4] as above

Examples 2-13 and 2-14 show low values of D50 and D90. Comparative Examples 2-15-C and 2-16-C are comparative because glycerol is not a fatty alcohol, and so there is no stabilizer of the required type present in 2-15-C or 2-16-C.

| Number | 2-17 | 2-18 | 2-19 | 2-20-C | 2-21-C | 2-22 |
|---|---|---|---|---|---|---|
| Media (mm) | 0.4 | 0.4 | 0.4 | 0.4 | 0.4 | 0.4 |
| Temp[1] (° C.) | na[4] | 17-19 | 17-23 | 12 | 11-12 | 14-31 |
| Anionic Surf. | DSSS | DSSS | DSSS | SSL | none | SDS |
| Anionic Surf. %[2] | 6.4 | 6.4 | 2.9 | 1.1 | 0 | 3.9 |
| 1st Stabilizer | Glycerol | Glycerol | Glycerol | Stab1a | Stab1a | Stab1b |
| 1st Stabilizer %[2] | 38.8 | 49.7 | 25.5 | 5.2 | 8.6 | 2.9 |
| 2nd Stabilizer | CA | CA | SA | none | Stab2 | none |
| 2nd Stabilizer %[2] | 0.5 | 0.5 | 1.8 | 0 | 4.9 | 0 |
| 3rd Stabilizer | none | none | Stab3 | none | none | none |
| 3rd Stabilizer %[2] | 0 | 0 | 1.7 | 0 | 0 | 0 |
| Specific E[3] | 26.5 | na[4] | na[4] | 76.6 | 87.6 | na[4] |
| D50 (μm) | 5.2 | 1.2 | 2.9 | 1.3 | 5.5 | 1.7 |
| D90 (μm) | 12.1 | 4.1 | 7.7 | 5.2 | 10.4 | 6.5 |

[1]-[4] as above

Examples 2-17 through 2-19 fall within the present invention. However, Examples 2-17 through 2-19 use DSS as the anionic surfactant, and they do not perform as well as Examples that use SDS as the anionic surfactant. Comparative Example 2-20-C is comparative because the amount of anionic surfactant is too low. Comparative Example 2-21-C is comparative because there is no anionic surfactant. Example 2-22 falls within the present invention; it shows relatively large values of D50 and D90 because the temperature rose above 20° C. for some of the time during the process, and Example 2-22 did not perform as well as Examples in which the temperature remained below 20° C. for the entire process.

EXAMPLE 3

The Effect of Temperature

Slurry was made and ground as described in Example 1. Media size was 0.4 μm. Anionic Surfactant was 2.9% SDS. Stabilizer was 6.5% Stab1. The particle size was measured at intervals throughout the grinding process, and the temperature was changed during the grinding process. The results were as follows:

| Time (hr) | Temp (° C.) | D90 (μm) |
|---|---|---|
| 1.23 | 30 | 22.9 |
| 2.5 | 31 | 22.6 |
| 4.75 | 31 | 9.0 |
| 7.25 | 32 | 12.0 |
| 8.25 | 22 | 6.8 |
| 9 | 17 | 5.3 |
| 10.6 | 16 | 4.9 |
| 11.5 | 17 | 5.0 |
| 13 | 11 | 7.4 |
| 15.5 | 11 | 118.2 |
| 16.5 | 11 | 13.5 |
| 17.25 | 11 | 0.51 |

Example 3 shows that grinding for 11.5 hours at temperature above 15° C. does not result in D90 below 1 μm. When the temperature is lowered, an additional 6.25 hours at 11° C. resulted in D90 below 1 μm.

EXAMPLE 4

The Effect of Temperature

Slurry was made and ground as described in Example 1. Media size was 0.4 μm. Anionic Surfactant was 3.1% SDS. Stabilizer was 6.9% Stab1. The particle size was measured at intervals throughout the grinding process, and the temperature was changed during the grinding process. The results were as follows:

| Time (hr) | Temp (° C.) | D90 (μm) |
|---|---|---|
| 1 | 33 | 13.8 |
| 2 | 28 | 11.12 |
| 2.5 | 28 | 11.42 |
| 3.5 | 24 | 8.54 |
| 6.25 | 8 | 49.45 |
| 7 | 9 | 62.67 |
| 8 | 10 | 66.95 |
| 9.25 | 11 | 0.82 |
| 10.25 | 12 | 0.7 |

Example 4 shows that grinding for 3.5 hours at temperature above 15° C. did not result in D90 below 1 μm. When the temperature was lowered, an additional 4 hours at 8-12° C. resulted in D90 below 1 μm.

The invention claimed is:

1. A process for reducing the size of ethylcellulose polymer particles comprising
   (a) providing a slurry comprising
      (i) a continuous liquid medium comprising water
      (ii) said ethylcellulose polymer particles, wherein said ethylcellulose polymer particles have D50 of 100 μm or less;

(iii) surfactant comprising 1.2% or more anionic surfactants by weight based on the solid weight of said slurry, with the proviso that if the amount of anionic surfactant is 2.5% or less by weight based on the solid weight of said slurry, then said surfactant further comprises 5% or more stabilizers by weight based on the solid weight of said slurry, wherein said stabilizer is selected from the group consisting of water-soluble polymers, water-soluble fatty alcohols, and mixtures thereof, (b) grinding said slurry in an agitated media mill having a collection of grinding media particles having a median particle size of 550 μm or smaller, wherein said grinding step comprises passing said slurry through said media mill to produce an intermediate slurry that exits said media mill via an exit; and then circulating said intermediate slurry through a loop comprising a heat exchanger and said media mill.

2. The process of claim 1, wherein said intermediate slurry at said exit of said media mill is kept at a temperature of 9 to 15° C.

3. The process of claim 1, wherein said surfactant comprises 2.5% or less anionic surfactants by weight based on the solid weight of said slurry, and wherein said surfactant additionally comprises 5% or more polyvinyl alcohol by weight based on the solid weight of said slurry.

4. The process of claim 1, wherein said surfactant comprises 2.5% or less anionic surfactants by weight based on the solid weight of said slurry, and wherein said surfactant additionally comprises 5% or more water-soluble fatty alcohol by weight based on the solid weight of said slurry.

5. The process of claim 4, wherein the water-soluble fatty alcohol molecule does not contain any sulfate, sulfonate, phosphate, or carboxylate groups.

6. The process of claim 4, wherein the water-soluble fatty alcohol is a fatty ester having the structure of an ester of a fatty carboxylic acid with a multihydroxyl alcohol, in which one or more of the hydroxyl groups on the multihydroxyl alcohol remains as a hydroxyl group.

7. The process of claim 1, wherein said ethylcellulose polymer has ethyl ether content of from 44% to 51%.

8. The process of claim 1, wherein said surfactant comprises 2.5% or less anionic surfactants by weight based on the solid weight of said slurry, and wherein said surfactant additionally comprises 5% or more water-soluble polymer by weight based on the solid weight of said slurry, and wherein the water-soluble polymer is selected from the group consisting of polyvinyl alcohol, poly(N-vinyl pyrrolidone), and neutral water-soluble polymers that are derivatives of cellulose.

9. The process of claim 1, wherein said ethylcellulose polymer has viscosity of from 2 mPa-s to 120 mPa-s.

10. The process of claim 1, wherein said anionic surfactant has a single fatty group.

11. The process of claim 1, wherein said anionic surfactant is selected from the group consisting of sulfates, sulfonates, phosphates, and carboxylates.

12. The process of claim 1, wherein said anionic surfactant is a sulfate.

13. The process of claim 1, wherein the amount of material other than water, ethylcellulose polymer, anionic surfactant, and stabilizer (if present) in the slurry is from 0 to 3% by weight based on the solid weight of the slurry.

14. The process of claim 1, wherein said intermediate slurry at said exit of said media mill is kept at a temperature of 0 to 15° C.

15. The process of claim 1 further comprising generating an aqueous dispersion of ethylcellulose polymer particles having D90 of 2 μm or less.

16. The process of claim 1, wherein the agitated media mill comprises one or more agitator that applies mechanical agitation to the grinding media particles.

17. The process of claim 16, wherein the agitator comprises a rotating shaft with disks or pins or both attached therewith.

18. The process of claim 1, wherein the continuous liquid medium comprises 80% or more of water by weight based on the weight of the continuous liquid medium.

19. The process of claim 1, wherein the continuous liquid medium comprises 90% or more of water by weight based on the weight of the continuous liquid medium.

20. The process of claim 1, wherein the temperature of said slurry is between 0° C. to 20° C.

21. The process of claim 1, wherein the temperature of said slurry is from 6° C. to 15° C.

* * * * *